(12) United States Patent
Kajiyama et al.

(10) Patent No.: US 6,337,132 B1
(45) Date of Patent: Jan. 8, 2002

(54) LAYERED ROCK SALT-TYPE OXIDE PARTICLE POWDER AND PROCESS FOR PRODUCING THE SAME

(75) Inventors: Akihisa Kajiyama; Tatsuya Nakamura, both of Hiroshima-ken (JP)

(73) Assignee: Toda Kogyo Corporation, Hiroshima (JP)

( * ) Notice: Subject to any disclaimer, the term of this patent is extended or adjusted under 35 U.S.C. 154(b) by 0 days.

(21) Appl. No.: 09/538,227

(22) Filed: Mar. 30, 2000

(30) Foreign Application Priority Data

Mar. 31, 1999 (JP) .............................. 11-090999

(51) Int. Cl.$^7$ ................................ B32B 5/16
(52) U.S. Cl. ................ 428/403; 428/404; 428/405; 427/220; 429/223; 423/138; 423/144; 423/179; 423/199.5; 423/186
(58) Field of Search ................ 428/404, 403, 428/405; 429/223; 423/138, 144, 179, 179.5, 186; 427/220

(56) References Cited

U.S. PATENT DOCUMENTS 6,156,430 A * 12/2000 Weber et al. ............... 428/403

FOREIGN PATENT DOCUMENTS

| EP | 652 602 A2 * | 9/1994 |
| EP | 0 794 586 A1 | 3/1997 |
| EP | 0 867 48 A1 | 3/1998 |
| JP | 2-75158 | 3/1990 |

* cited by examiner

*Primary Examiner*—Leszek Kiliman
(74) *Attorney, Agent, or Firm*—Armstrong, Westerman, Hattori, McLeland & Naughton LLP

(57) ABSTRACT

The present invention provides a lithium nickel-layered rock salt-type oxide particle powder, a lithium cobalt-layered rock salt-type oxide particle powder or a particle powder of a solid solution of these layered rock salt-type oxides, wherein the surface of the particle is rendered hydrophobic by coating it with a coupling agent having both a hydrophobic group and a hydrophilic group. The layered rock salt-type oxide particle powder is free of an adverse effect caused by adsorbed water because of less amount of water adsorbed on the surface of the particle powder, high in electrochemical charging and discharging capacities, low in cycle deterioration, so that it is especially useful as a positive electrode active material in a lithium battery.

8 Claims, No Drawings

LAYERED ROCK SALT-TYPE OXIDE PARTICLE POWDER AND PROCESS FOR PRODUCING THE SAME

BACKGROUND OF THE INVENTION

1. Field of the Invention

The present invention relates to a layered rock salt-type oxide particle powder and a process for producing the same, and in particular to a lithium nickel-layered rock salt oxide particle powder, a lithium cobalt-layered rock salt-type oxide particle powder or a particle powder of a solid solution of these layered rock salt-type oxides, having large charging and discharging capacities with a less amount of adsorbed water in the surface of the particle and with less cycle deterioration, which is particularly useful as a positive electrode active material in a lithium battery, as well as a process for producing the same.

2. Description of the Prior Art

As the development of portable devices such as personal computers, portable telephones, etc. advances in recent years, there is an increasing demand for batteries as a power source. In particular, lithium batteries are extensively studied in various fields because lithium is a substance having a low atomic weight and a high ionization energy and can thus be expected to provide batteries with high electromotive force and high energy density.

Lithium nickel-layered rock salt-type oxides, lithium cobalt-layered rock salt-type oxides and solid solutions thereof or lithium manganese spinel oxides, which are capable of generating a high voltage of about 4 V, are extensively studied as positive electrode active materials used in the lithium battery. These compounds such as layered rock salt-type oxides and spinel oxides are obtained by mixing a starting oxide powder containing nickel, cobalt or manganese with a lithium compound powder and then calcinating the mixture. In particular, lithium cobalt-layered rock salt-type oxides, lithium nickel-layered rock salt-type oxides or solid solutions thereof are known to have higher energy density and better cycle characteristics than those of lithium manganese spinel oxides.

These positive electrode active materials in the form of powder are dispersed in a binder, coated on a metal plate such as copper, and dried for use as a positive electrode in a battery, wherein it is important that the particle-shape and particle size are well-regulated because, as the packing of the particle powder in the coating is increased, the capacity of the resulting battery is raised.

A non-aqueous organic electrolyte is used in a lithium ion battery, but it is said that if a trace of water is present in the electrolyte, the electrolyte is electrolyzed to generate a gas such as carbon dioxide (Denki Kagaku No. 11 (1994) 1023–1029), and in this case, there is a possible danger of the battery cell breakage. Further, if lithium nickel-layered rock salt-type oxides are used in such a cell, their characteristics in the battery are easily affected by the production environment such as humidity, etc., and therefore, it is said that it is necessary to control drying conditions strictly (the Japanese Society of Electric Information Communication, Technical Study Report EE98-72 (1999–01) 57–66). Generally, a powdery material has some water adsorbed in the surface thereof, but according to the above literature, it is considered that residual water in the particle powder as the positive electrode material should also be minimized.

Under the background described above, as particle powders of lithium cobalt-layered rock salt-type oxides, lithium nickel-layered rock salt-type oxides and solid solutions thereof acting as material powders for positive electrode active materials, there is a need for layered rock salt-type oxide particle powders having a narrow distribution of particle sizes with the least amount of water remaining in the surface of the particle, as well as a process for producing the same.

SUMMARY OF THE INVENTION

An object of the present invention is to provide particle powders of lithium cobalt-layered rock salt-type oxides, lithium nickel-layered rock salt-type oxides and solid solutions of these rock salt-type oxides having a narrow distribution of particle sizes with the least amount of water remaining in the surface of the particle.

Another object of the present invention is to provide a process for producing the above-mentioned particle powders of lithium cobalt-layered rock salt-type oxides, lithium nickel-layered rock salt-type oxides and solid solutions of these rock salt-type oxides.

Further objects and advantages of the present invention will become apparent for those skilled in the art from the detailed description and explanation given below.

As a result of an extensive series of studies in view of the problems described above, the present inventors have found out that a layered rock salt-type oxide particle powder whose surface has been rendered substantially hydrophobic by coating it with a coupling agent having both a hydrophobic group and a hydrophilic group, particularly a layered rock salt-type oxide powder particle obtained in a specific method, can solve the problems described above, thereby arriving at the present invention.

DETAILED DESCRIPTION OF THE INVENTION

That is, the first aspect of the present invention is directed to a lithium nickel-layered rock salt-type oxide particle powder, a lithium cobalt-layered rock salt-type oxide particle powder, or a particle powder of a solid solution of these layered rock salt-type oxides, wherein the surface of the particle is rendered hydrophobic by coating it with a coupling agent having both a hydrophobic group and a hydrophilic group.

The second aspect of the present invention is directed to a process for producing a lithium nickel-layered rock salt-type oxide particle powder, a lithium cobalt-layered rock salt-type oxide particle powder, or a particle powder of a solid solution of these layered rock salt-type oxides, which comprises the steps of:

mixing each particle powder of nickel oxide, cobalt oxide, or a solid solution of these oxides with a lithium compound, allowing the mixed powder to incorporate 1 to 10% by weight of water and compression-molding it to form a molded body having a molding density of not less than 2 g/cm$^3$, calcining the molded body at 600 to 900° C. in an oxygen-containing gas to form a lithium nickel-layered rock salt-type oxide, a lithium cobalt-layered rock salt-type oxide or a solid solution of these layered rock salt-type oxides, dispersing the layered rock salt-type oxide in an organic solvent, and adding a coupling agent to this dispersion in order to coat the surface of the particle therewith.

In a preferred embodiment of the present invention, each particle powder of nickel oxide or cobalt oxide is obtained by pyrolyzing at least one member selected from the group consisting of nickel- or cobalt-containing oxalate, acetate and carbonate at 350 to 500° C. in an oxygen-containing gas.

In a preferred embodiment of the present invention, each particle powder of the solid solution of nickel oxide and cobalt oxide is obtained by pyrolyzing at least one member selected from the group consisting of nickel- and cobalt-containing oxalate, acetate and carbonate at 350 to 500° C. in nitrogen or an inert gas.

In a preferred embodiment of the present invention, the particle powder of cobalt oxide is obtained by hydrothermal synthesis from a suspension containing cobalt hydroxide in the presence of an oxygen-containing gas.

In a preferred embodiment of the present invention, the mixing ratio of each particle powder of nickel oxide, cobalt oxide or a solid solution of these oxides and the lithium compound is in the range of 1.00 to 1.20 in terms of the molar ratio (Li/M) of lithium to nickel, cobalt, or the total of nickel and cobalt.

In a preferred embodiment of the present invention, the amount of the coupling agent for treatment is in the range of 0.1 to 5.0% by weight to the layered rock salt-type oxide particles.

Each powder of nickel oxide, cobalt oxide and a solid solution thereof (also referred to hereinafter as transition metal oxide) used in the present invention is not particularly limited. The nickel oxide and cobalt oxide are preferably those obtained by pyrolyzing nickel- or cobalt-containing acetate, oxalate, carbonate, etc. at 350 to 500° C. in an oxygen-containing gas preferably in the air or oxygen, and the solid solution of nickel oxide and cobalt oxide is preferably the one obtained by pyrolyzing nickel- and cobalt-containing acetate, oxalate, carbonate, etc. at 350 to 500° C. in an inert gas such as nitrogen or argon. Further, the cobalt oxide can also be obtained by hydrothermal synthesis from a suspension containing cobalt hydroxide in the presence of an oxygen-containing gas.

If the pyrolysis temperature is less than 350° C., the pyrolysis of a powder of a salt containing nickel and/or cobalt (also referred to hereinafter as transition metal) is not satisfactory, thus making it difficult to obtain an oxide particle powder having a uniform composition, while if it is more than 500° C., the reactivity of the resulting oxide particle powder is lowered.

Then, the transition metal oxide particle powder is mixed with a lithium compound. The mixing ratio of the lithium compound to the transition metal oxide particle powder, in terms of the molar ratio of lithium to transition metal (Li/M), is preferably in the range of 1.00 to 1.20. If the amount of lithium is lower than this range, then non-positive electrode materials such as nickel oxide, cobalt oxide or solid solutions thereof remain besides the desired layered rock salt-type oxides. These non-positive electrode oxides are difficult to be removed, and thus when a positive electrode is composed of such a particle powder containing them, an excellent battery characteristic, that is, an electrochemical activity in an electrolyte having lithium ion electrical conductivity, is hardly obtainable. On the other hand, if lithium is contained in a larger amount than said range, non-positive electrode active materials such as lithium carbonate, etc. occur in addition to said layered rock salt-type oxides. Removal of these impurities is also very difficult, and thus when a positive electrode is composed of this powder, excellent battery characteristics and electrochemical activity are also hardly obtainable.

The lithium compound used in the present invention includes lithium carbonate, lithium oxide, lithium hydroxide, and lithium hydroxide monohydrate, and these are used alone or in combination thereof.

Then, 1 to 10% by weight of water is contained in the mixed powder consisting of the transition metal oxide particle powder and the lithium compound, and this mixed powder is compression-molded by an extrusion molding machine, a roller compactor or a disk pelleter, to form a molded body having a molding density of not less than 2 g/cm$^3$, and then calcined in an oxygen-containing gas, e.g. the air. If the amount of water in the mixed powder is less than 1% by weight, the strength of the molded body is not satisfactory, thus making handling difficult, and the compressed density in the molded body is not uniform, and this causes a broader distribution of particle sizes of the layered rock salt-type oxide particle powder obtained by grinding after calcination. On the other hand, if it exceeds 10% by weight, the water-soluble lithium compound is readily eluted to change the composition, and thus the qualities of the layered rock salt-type oxide particle powder are made unstable.

Further, if a molded body having a molding density of less than 2 g/cm$^3$ is calcined, the growth of grains of the layered rock salt-type oxide is not satisfactory so that upon forming into a coating film, it produces a film with insufficient packing. The upper limit of the molding density is not particularly limited, but because too high density makes production difficult, its upper limit is usually 3.5 g/cm$^3$, preferably 2.5 g/cm$^3$ or so.

The above molded body is calcined in an oxygen-containing gas, preferably in the air. The calcination temperature is in the range of 600 to 900° C., and the calcination time is usually in the range of 2 to 10 hours. If the calcination temperature is less than 600° C., the molded body should be calcined for a longer time in order to achieve a single phase of the layered rock salt-type oxide. Further, it produces particles with poor crystallinity, thus failing to exhibit satisfactory battery characteristics. On the other hand, if the calcination temperature exceeds 900° C., a part of the layered rock salt-type oxide is decomposed or a part of lithium is lost by evaporation, and thus a particle powder showing sufficient battery characteristics cannot be obtained.

Thereafter, the layered rock salt-type oxide is dispersed in an organic solvent, and a coupling agent is added to this dispersion in order to coat the surface of the particle therewith. Because it is desired that the surface of the particle is coated uniformly, the coating thereof with the coupling agent is conducted preferably not in a dry system but in a wet system, that is, in an organic solvent.

The amount of the coupling agent for treatment may be an amount enough to render the surface of the particle hydrophobic, and this amount is usually in the range of 0.1 to 5.0% by weight to the particle. If the amount of the coupling agent is less than 0.1% by weight, the amount of the coupling agent coated is so small that its effect is not satisfactory. On the other hand, if the amount of the coupling agent for treatment exceeds 5.0% by weight, the efficiency is deteriorated by its excess amount, and thus too large amount of the coupling agent for treatment is meaningless, The coupling agent used in the present invention includes titanate coupling agents such as isopropyltriisostearoyl titanate, isopropyltridecyl benzene sulfonyl titanate, isopropyl tris(dioctylpyrophosphate)titanate, tetra(2,2-diallyloxymethyl-1-butyl)bis(ditridecyl)phosphite titanate and bis(dioctylpyrophosphate) oxyacetate titanate, bis (dioctylpyrophosphate)ethylene titanate as well as silane coupling agents such as γ-chloropropyltrimethoxysilane, γ-methacryloxypropyltrimethoxysilane and γ-glycido xypropyltrimethoxysilane, and these are used alone or in combination thereof.

The organic solvent used in the present invention includes toluene, methyl ethyl ketone, methyl isobutyl ketone, etc., and these are used alone or in combination thereof.

Prior to dispersion of the layered rock salt-type oxide, the molded body of the layered rock salt-type oxide may be ground and dispersed in an organic solvent, or otherwise the molded body may be ground in an organic solvent in a wet system.

The layered rock salt-type oxide particle powder of lithium nickel, lithium cobalt or a solid solution thereof, obtained in the manner described above, has been rendered hydrophobic by uniformly coating the surface of the particle with the coupling agent. Accordingly, the amount of water adsorbed in the surface of the particle is so small that this product has high charging and discharging capacities with less cycle deterioration and without any adverse effect of adsorbed water on the charging and discharging capacities, cycle characteristics, etc. and is particularly useful as a positive electrode active material in a lithium battery.

The most important feature of the present invention is that the layered rock salt-type oxide particle powder has been rendered substantially hydrophobic by coating the surface of the particle with a coupling agent having both a hydrophobic group and a hydrophilic group.

Another important feature of the present invention is the fact that a transition metal oxide particle powder is mixed with a lithium compound, then this mixed powder is allowed to incorporate 1 to 10% by weight of water and compression-molded to prepare a molded body with a molding density of not less than 2 $g/cm^3$, then calcined at 600 to 900° C. in an oxygen-containing gas to form a layered rock salt-type oxide, and thereafter said layered rock salt-type oxide is dispersed in an organic solvent followed by adding a coupling agent to this dispersion to coat the surface of the particle uniformly therewith, whereby the desired layered rock salt-type oxide particle powder having a narrow distribution of particle sizes with a minimum amount of residual water in the surface of the particle can be obtained.

It is considered that a solid state reaction during calcination proceeds generally through mutual diffusion of starting powder particles at a point where they are contacted with each other. The present inventors think that in the case of the lithium compound and the transition metal oxides, the reaction proceeds mainly through diffusion of lithium into the oxide particles because the melting point of lithium is considerably lower than the melting points of these oxides, to permit the diffusion of lithium to occur more readily than diffusion of the transition metals such as nickel and cobalt. On the basis of this thought, selection of the oxide particles is more important than selection of the lithium compound, and the present inventors considered that by this selection, the desired layered rock salt-type oxide having a well-regulated distribution of particle sizes can be formed.

Then, a particle powder of nickel oxide, cobalt oxide or a solid solution thereof synthesized particularly in a specific process was used as a starting transition metal as a result of their extensive examination, whereby the reaction thereof with lithium rapidly proceeded upon calcination, that is, the reactivity of the starting transition metal was enhanced, thus succeeding in formation of the layered rock salt-type oxide with a well-regulated distribution of particle sizes.

The reason for the foregoing is not yet clarified, but is possibly because the purity of the particle powder of transition metal oxides prepared in this process is extremely high while the concentration of impurities such as alkali metals, alkaline earth metals, etc. is significantly low.

Further, it is considered that the layered rock salt-type oxide particles with a well-regulated distribution of particle sizes can be formed because the starting powder is highly reactive as described above and because the layered rock salt-type oxide is prepared by adding 1 to 10% by weight of water to the mixed powder and compression-molding this powder to prepare a molded body having a molding density of not less than 2 $g/cm^3$. If water-free dry powder is used, the particle powder will hardly slide in compression molding, thus making it difficult to transmit compressing pressure uniformly through the system, resulting in non-uniform degree of compressed density. By incorporating a specific amount of water in the system, the particle powder will easily slide to permit compressing pressure to be uniformly transmitted through the system, thereby providing the resulting molded body with uniform compressed density so that a product obtained by calcining and grinding this molded body provides the layered rock salt-type oxide particles with a well-regulated distribution of particle sizes.

The layered rock salt-type oxide thus obtained has a less water content just after calcination, but thereafter it gradually absorbs water from the air atmosphere, resulting in the presence of remaining water in a considerable amount. Accordingly, the layered rock salt-type oxide particles thus obtained are dispersed in an organic solvent, and a coupling agent is added to this dispersion in order to coat the particles uniformly therewith, whereby the layered rock salt-type oxide particle powder having a less content of remaining water in the surface of the particle while maintaining the particle size and particle distribution can formed. The reason speculated for this is that hydrophilic groups in the coupling agent undergo substitution reaction with hydroxyl groups on the surface of the layered rock salt-type oxide particles and the oxide particle surface adsorbs the coupling agent thereon with the hydrophobic groups in the coupling agent orientated to the outside of the particles, and these hydrophobic groups render the surface of the particles hydrophobic, thus substantially preventing adsorption of water from the air atmosphere and minimizing residual water on the surface.

Hereinafter, the present invention is described in more detail by reference to the Examples and Comparative Examples, but these are not intended to limit the present invention.

The identification and crystal structure of each reaction product powder were examined by X-ray diffraction (RIGAKU, Mn-filtered Fe—Ka, 40 kV and 20 mA). The particle diameter and shape were examined under a scanning electron microscope.

As a measure of surface hydrophobicity, the amount of adsorbed water in a powder was determined by a Karl Fischer moisture meter after the powder was left in an atmosphere at a temperature of 25° C. under 65% relative humidity for 20 hours.

EXAMPLE 1

<Production of lithium nickel-layered rock salt-type oxide particle powder>

1.5 equivalents of an aqueous solution of oxalic acid (concentration=10% by weight) were added dropwise to an aqueous solution of nickel sulfate (concentration=10% by weight), to form precipitates of nickel oxalate, which were then filtered off, washed with water and dried, and the resulting dried powder was pyrolyzed at 400° C. in the air, to prepare a nickel oxide particle powder. This nickel oxide particle powder and lithium hydroxide monohydrate [Li (OH) $H_2O$] were weighed at a molar ratio (Li/M) of 1.03 and mechanically mixed, and the resulting mixed powder was sprayed with 5% by weight of water. This mixed powder was compression-molded by a roller compactor to prepare a molded body having a molding density of 2.2 g/cm$^3$. This molded body was placed in an electric furnace and heated at 700° C. in an oxygen stream and calcinated for 10 hours. The resulting molded body was ground again in a mortar to give a black powder.

The resulting black powder was a lithium nickel-layered rock salt-type oxide particle powder and had good crystallinity, and as a result of observation under a scanning electron microscope, its particle size was well-regulated.

10 g of this lithium nickel-layered rock salt-type oxide particle powder was dispersed in 100 cm$^3$ toluene, and to this dispersion was added isopropyltriisostearoyl titanate as a titanium coupling agent in an amount of 1.0% by weight to the particle powder, whereby the surface of the particle was uniformly coated therewith, and this product was filtered off and air-dried. As a result of X-ray diffraction, the resulting black powder was a lithium nickel-layered rock salt-type oxide particle powder and had good crystallinity, and as a result of observation under a scanning electron microscope, the particle diameter and distribution of particle sizes thereof did not change from those before heat treatment. Further, the amount of adsorbed water was 0.12% by weight, indicating that the surface of the particle had been rendered sufficiently hydrophobic.

<Evaluation of electrochemical characteristics>

Then, the lithium nickel-layered rock salt-type oxide particle powder thus obtained was examined for its electrochemical characteristics as an electrode active material. To prepare a positive electrode for measurement, polytetrafluoroethylene as a binder in an amount of 5% by weight and Acetylene Black as an electrically conductive material in an amount of 20% by weight were mixed respectively in said layered rock salt-type oxide particle powder, and 0.1 g of the resulting mixture was weighed and loaded into a mesh of titanium as a current collector to prepare a work electrode. As a negative electrode, a metal foil of lithium was loaded into a stainless steel mesh. As a reference electrode, a lithium metal was used. A solution of 1 M $LiBF_4$ in a mixed solvent consisting of propylene carbonate and dimethoxyethane at a ratio of 1:1 by volume was used as an electrolyte.

The positive work electrode for measurement, the negative electrode, the reference electrode and the electrolyte which were prepared above were used to construct an electrochemical cell for measurement. This electrochemical cell was used to examine a curve of charging and discharging in the potential range of 3.0 to 4.5 V with the metal lithium electrode as the reference, at a current of 0.5 mA/cm$^2$ at a temperature of 30° C. The electrochemical charging and discharging capacities were determined as an indicator of the electrochemical activity of this lithium nickel-layered salt-type oxide particle powder, and the result indicated that its initial capacity was as high as 190 mAh/g and its capacity after 10 cycles was 189 mAh/g, indicating almost no cycle deterioration.

EXAMPLE 2

A layered rock salt-type oxide was obtained in the same manner as in Example 1 except that 1.5 equivalents of an aqueous solution of oxalic acid (concentration=10% by weight) were added dropwise to an aqueous solution containing nickel sulfate and cobalt sulfate (each of both concentrations=10% by weight) at a molar ratio of (Ni/Co) being 8/2, to form precipitates of a solid solution of nickel oxalate and cobalt oxalate, and this product was filtered off, washed with water and dried, and then the dried powder was pyrolyzed at 400° C. in nitrogen to prepare a solid solution particle powder of nickel oxide and cobalt oxide, and also that the preparation conditions were changed as shown in Table 1. As a result of X-ray diffraction, the resulting black powder was a particle powder of a solid solution of lithium nickel-layered rock salt-type oxide and lithium cobalt-layered rock salt-type oxide and had good crystallinity. Further, the amount of adsorbed water was 0.10% by weight, indicating that the surface of the particle had been rendered sufficiently hydrophobic.

The electrochemical capacity of the resulting particle powder is shown in Table 1, indicating that the layered rock salt-type oxide particle powder had large electrochemical charging and discharging capacities with less cycle deterioration in charging and discharging characteristics.

EXAMPLES 3 TO 4

A reaction product powder was obtained in the same manner as in Example 2 except that the preparation conditions were changed as shown in Table 1. The adsorbed water and electrochemical capacity of the resulting reaction product are shown in Table 1.

It was recognized that any particle powder obtained in Examples 3 to 4 was composed of particles having the structure of layered rock salt-type oxide particle powder with a well-regulated distribution of particle sizes, and the amount of adsorbed water was low, indicating that the surface thereof had been rendered sufficiently hydrophobic. The layered rock salt-type oxide particle powder had large electrochemical charging and discharging capacities with less cycle deterioration in charging and discharging characteristics.

EXAMPLE 5

A layered rock salt-type oxide was obtained in the same manner as in Example 1 except that 1.5 equivalents of an aqueous solution of oxalic acid (concentration=10% by weight) were added dropwise to an aqueous solution of cobalt sulfate (concentration=10% by weight) to form precipitates of cobalt oxalate, and this product was filtered off, washed with water and dried, and then the dried powder was pyrolyzed at 400° C. in the air to prepare a cobalt oxide particle powder, and also that the preparation conditions were changed as shown in Table 1. As a result of X-ray diffraction, the resulting black powder was a particle powder of lithium cobalt layered rock salt-type oxide and had good crystallinity. Further, the amount of adsorbed water was 0.10% by weight, indicating that the surface of the particle had been rendered sufficiently hydrophobic.

The electrochemical capacity of the resulting particle powder is shown in Table 1, indicating that the layered rock salt-type oxide particle powder had large electrochemical charging and discharging capacities with less cycle deterioration in charging and discharging characteristics.

COMPARATIVE EXAMPLES 1 TO 2

A reaction product particle powder was obtained in the same manner as in Examples 1 and 2 except that the preparation conditions were changed as shown in Table 1. The adsorbed water and electrochemical capacity of the resulting reaction product are shown in Table 1.

It was recognized that any particle powder obtained in Comparative Examples 1 and 2 was composed of particles having the structure of layered rock salt-type oxide particle powder with a well-regulated distribution of particle sizes, but the amount of adsorbed water was high, and further it had large charging and discharging capacities at the initial cycle, but underwent significant cycle deterioration.

carbonate and cobalt carbonate, and this product was filtered off, washed with water and dried, and then the dried powder was pyrolyzed at 450° C. in nitrogen to prepare a solid solution particle powder of nickel oxide and cobalt oxide, and also that the preparation conditions were changed as

TABLE 1

| | Starting transition metal | Pyrolysis Atmosphere | Pyrolysis Temperature (° C.) | Li/M molar ratio (° C.) | Water content (wt-%) | Density of molded body (g/cc) | Calcination Temperature (° C.) | Calcination Time (hrs) | Coupling agent Kind | Amount for treatment (wt-%) | Content of adsorbed water (wt-%) | Electrochemical capacity (mAh/g) |
|---|---|---|---|---|---|---|---|---|---|---|---|---|
| Example 1 | Ni oxalate | Air | 400 | 1.03 | 5 | 2.2 | 700 | 10 | isopropyl triisostearoyl titanate | 1.0 | 0.12 | 190/189 |
| Example 2 | NiCo oxalate (Ni/Co = 8/2) | Nitrogen | 400 | 1.03 | 5 | 2.2 | 850 | 10 | γ-glycidoxy-propyl tri-methoxy silane | 3.5 | 0.10 | 163/163 |
| Example 3 | NiCo oxalate (Ni/Co = 8/2) | Nitrogen | 400 | 1.03 | 5 | 2.2 | 750 | 5 | isopropyl triisostearoyl titanate | 0.5 | 0.11 | 164/166 |
| Example 4 | NiCo oxalate (Ni/Co = 9/1) | Nitrogen | 400 | 1.03 | 5 | 2.2 | 700 | 7 | isopropyl triisostearoyl titanate | 1.0 | 0.13 | 167/167 |
| Example 5 | Co oxalate | Air | 400 | 1.03 | 5 | 2.2 | 850 | 8 | bis(dioctyl-pyrophosphate) ethylene titanate | 1.5 | 0.10 | 134/134 |
| Comparative Example 1 | Ni oxalate | Air | 400 | 1.03 | 5 | 2.2 | 750 | 10 | — | 0 | 0.68 | 180/156 |
| Comparative Example 2 | NiCo oxalate (Ni/Co = 8/2) | Nitrogen | 400 | 1.03 | 5 | 2.2 | 700 | 10 | — | 0 | 0.55 | 164/150 |

Electrochemical capacity (capacity of discharge in the first cycle)/(capacity of discharge in the tenth cycle)

EXAMPLE 6

A layered rock salt-type oxide was obtained in the same manner as in Example 1 except that 1.5 equivalents of an aqueous solution of sodium carbonate (concentration=10% by weight) were added dropwise to an aqueous solution of nickel sulfate (concentration=10% by weight) to form precipitates of nickel carbonate, and this product was filtered off, washed with water and dried, and then the dried powder was pyrolyzed at 450° C. in the air to prepare a nickel oxide particle powder, and also that the preparation conditions were changed as shown in Table 2. As a result of X-ray diffraction, the resulting black powder was a lithium nickel-layered rock salt-type oxide particle powder and had good crystallinity. Further, the amount of adsorbed water was 0.14% by weight, indicating that the surface of the particle had been rendered sufficiently hydrophobic. In addition, the layered rock salt-type oxide particle powder had large electrochemical charging and discharging capacities with less cycle deterioration in charging and discharging characteristics.

EXAMPLE 7

A layered rock salt-type oxide was prepared in the same manner as in Example 6 except that 1.5 equivalents of an aqueous solution of sodium carbonate (concentration=10% by weight) were added dropwise to an aqueous solution containing nickel sulfate and cobalt sulfate (each of both concentrations=10% by weight) at a molar ratio of (Ni/Co) being 8/2, to form precipitates of a solid solution of nickel shown in Table 2. As a result of X-ray diffraction, the resulting black powder was a particle powder of a solid solution of lithium nickel-layered rock salt-type oxide and lithium cobalt-layered rock salt-type oxide and had good crystallinity. Further, the amount of adsorbed water was 0.13% by weight, indicating that the surface of the particle had been rendered sufficiently hydrophobic.

The electrochemical capacity of the resulting particle powder is shown in Table 2, indicating that the layered rock salt-type oxide particle powder had large electrochemical charging and discharging capacities with less cycle deterioration in charging and discharging characteristics.

EXAMPLES 8 TO 9

A reaction product powder was obtained in the same manner as in Example 7 above except that the preparation conditions were changed as shown in Table 2. The amount of adsorbed water and the electrochemical capacity of the resulting reaction product are shown in Table 2.

It was recognized that any particle powder obtained in Examples 8 to 9 was composed of particles having the structure of layered rock salt-type oxide particle powder with a well-regulated distribution of particle sizes, and the amount of adsorbed water was low, indicating that the surface thereof had been rendered sufficiently hydrophobic. The layered rock salt-type oxide particle powder had large electrochemical charging and discharging capacities with less cycle deterioration in charging and discharging characteristics.

EXAMPLE 10

A layered rock salt-type oxide was prepared in the same manner as in Example 6 except that 1.5 equivalents of an aqueous solution of sodium carbonate (concentration=10% by weight) were added dropwise to an aqueous solution of cobalt sulfate (concentration=10% by weight) to form precipitates of cobalt carbonate, and this product was filtered off, washed with water and dried, and then the dried powder was pyrolyzed at 450° C. in the air to prepare a particle powder of cobalt oxide, and also that the preparation conditions were changed as shown in Table 2. As a result of X-ray diffraction, the resulting black powder was a particle powder of a solid solution of lithium nickel-layered rock salt-type oxide and lithium cobalt-layered rock salt-type oxide and had good crystallinity. Further, the amount of adsorbed water was 0.12% by weight, indicating that the surface of the particle had been rendered sufficiently hydrophobic.

The electrochemical capacity of the resulting particle powder is shown in Table 2, indicating that the layered rock salt-type oxide particle powder had large electrochemical charging and discharging capacities with less cycle deterioration in charging and discharging characteristics.

COMPARATIVE EXAMPLES 3 TO 4

The reaction product particle powder was obtained in the same manner as in Examples 6 and 7 except that the preparation conditions were changed as shown in Table 2. The amount of adsorbed water and the electrochemical capacity of the resulting reaction product are shown in Table 2.

It was recognized that any powder obtained in Comparative Examples 3 and 4 was composed of particles having the structure of layered rock salt-type oxide particle powder with a well-regulated distribution of particle sizes, but the amount of adsorbed water was high, and further it had large charging and discharging capacities at the initial cycle, but underwent significant cycle deterioration.

TABLE 2

| | | Pyrolysis | | Li/M | | Density | Calcination | | Coupling agent | | | |
| --- | --- | --- | --- | --- | --- | --- | --- | --- | --- | --- | --- | --- |
| | Starting transition metal | Atmosphere | Temperature (° C.) | molar ratio (° C.) | Water content (wt-%) | of molded body (g/cc) | Temperature (° C.) | Time (hrs) | Kind | Amount for treatment (wt-%) | Content of adsorbed water (wt-%) | Electrochemical capacity (mAh/g) |
| Example 6 | Ni carbonate | Air | 450 | 1.03 | 5 | 2.2 | 800 | 8 | isopropyl triisostearoyl titanate | 2.5 | 0.14 | 168/166 |
| Example 7 | NiCo carbonate (Ni/Co = 8/2) | Nitrogen | 400 | 1.03 | 5 | 2.2 | 800 | 10 | isopropyl triisostearoyl titanate | 1.0 | 0.13 | 164/163 |
| Example 8 | NiCo carbonate (Ni/Co = 6/4) | Nitrogen | 450 | 1.03 | 5 | 2.2 | 750 | 9 | γ-glycidoxypropyl trimethoxy silane | 3.5 | 0.11 | 154/154 |
| Example 9 | NiCo carbonate (Ni/Co = 7/3) | Nitrogen | 450 | 1.03 | 5 | 2.2 | 700 | 6 | isopropyl triisostearoyl titanate | 0.5 | 0.14 | 158/157 |
| Example 10 | Co carbonate | Air | 400 | 1.03 | 5 | 2.2 | 800 | 10 | isopropyl triisostearoyl titanate | 0.7 | 0.12 | 133/133 |
| Comparative Example 3 | Ni carbonate | Air | 450 | 1.03 | 5 | 2.2 | 800 | 7 | — | 0 | 0.47 | 185/154 |
| Comparative Example 4 | NiCo carbonate (Ni/Co = 8/2) | Nitrogen | 450 | 1.03 | 5 | 2.2 | 750 | 5 | — | 0 | 0.52 | 163/130 |

Electrochemical capacity (capacity of discharge in the first cycle)/(capacity of discharge in the tenth cycle)

EXAMPLE 11

A layered rock salt-type oxide was prepared in the same manner as in Example 1 except that an aqueous solution of nickel acetate (concentration=10%, by weight) was spray-dried by a spray dryer, and the dried powder was pyrolyzed at 450° C. in the air to prepare a nickel oxide particle powder. As a result of X-ray diffraction, the resulting black powder was a lithium nickel-layered rock salt-type oxide particle powder and had good crystallinity. Further, the amount of adsorbed water was 0.10% by weight, indicating that the surface of the particle had been rendered sufficiently hydrophobic.

The electrochemical capacity of the resulting particle powder is shown in Table 3, indicating that the layered rock salt-type oxide particle powder had large electrochemical charging and discharging capacities with less cycle deterioration in charging and discharging characteristics.

EXAMPLE 12

A layered rock salt-type oxide was prepared in the same manner as in Example 11 except that an aqueous solution containing nickel acetate and cobalt acetate at a molar ratio of (Ni/Co) being 8/2 (each of both concentrations=10% by weight) was spray-dried by a spray dryer, and the dried powder was pyrolyzed at 450° C. in nitrogen to prepare a solid solution particle powder of nickel oxide and cobalt oxide, and also that the preparation conditions were changed as shown in Table 3. As a result of X-ray diffraction, the resulting black powder was a particle powder of a solid solution of lithium nickel-layered rock salt-type oxide and lithium cobalt-layered rock salt-type oxide and had good crystallinity. Further, the amount of adsorbed water was 0.12% by weight, indicating that the surface of the particle had been rendered sufficiently hydrophobic.

The electrochemical capacity of the resulting particle powder is shown in Table 3, indicating that the layered rock salt-type oxide particle powder had large electrochemical charging and discharging capacities with less cycle deterioration in charging and discharging characteristics.

EXAMPLES 13 TO 14

A reaction product powder was obtained in the same manner as in Example 12 except that the preparation conditions were changed as shown in Table 3. The adsorbed water and the electrochemical capacity of the resulting reaction product are shown in Table 3.

It was recognized that any particle powder obtained in Examples 13 to 14 was composed of particles having the structure of layered rock salt-type oxide particle powder with a well-regulated distribution of particle sizes, and the amount of adsorbed water was low, indicating that the surface thereof had been rendered sufficiently hydrophobic. It was found that the layered rock salt-type oxide particle powder could be obtained with large electrochemical charging and discharging capacities with less cycle deterioration in charging and discharging characteristics.

EXAMPLE 15

A layered rock salt-type oxide was prepared in the same manner as in Example 11 except that an aqueous solution of cobalt acetate (concentration=10% by weight) was spray-dried by a spray dryer, and the dried powder was pyrolyzed at 450° C. in the air to prepare a cobalt oxide particle powder, and also that the preparation conditions were changed as shown in Table 3. As a result of X-ray diffraction, the resulting black powder was a lithium cobalt-layered rock salt-type oxide particle powder and had good crystallinity. Further, the amount of adsorbed water was 0.10% by weight, indicating that the surface of the particle had been rendered sufficiently hydrophobic.

The electrochemical capacity of the resulting particle powder is shown in Table 3, indicating that the layered rock salt-type oxide particle powder had large electrochemical charging and discharging capacities with less cycle deterioration in charging and discharging characteristics.

COMPARATIVE EXAMPLES 5 TO 7

A reaction product particle powder was obtained in the same manner as in Examples 11 and 12 except that the preparation conditions were changed as shown in Table 3. The amount of adsorbed water and the electrochemical capacity of the resulting reaction product are shown in Table 3.

It was recognized that any particle powder obtained in Comparative Examples 5 to 7 was composed of particles-having the structure of layered rock salt-type oxide particle powder with a well-regulated distribution of particle sizes, but the amount of adsorbed water was high, and further it had large charging and discharging capacities at the initial cycle, but underwent significant cycle deterioration.

TABLE 3

| | | Pyrolysis | | Li/M | | Density | Calcination | | | Coupling agent | | Content of | Electro- |
| | Starting transition metal | Atmosphere | Temperature (° C.) | molar ratio | Water content (wt-%) | of molded body (g/cc) | Temperature (° C.) | Time (hrs) | Kind | Amount for treatment (wt-%) | adsorbed water (wt-%) | chemical capacity (mAh/g) |
|---|---|---|---|---|---|---|---|---|---|---|---|---|
| Example 11 | Ni acetate | Air | 450 | 1.03 | 5 | 2.2 | 750 | 10 | isopropyl triisostearoyl titanate | 1.0 | 0.10 | 191/189 |
| Example 12 | NiCo acetate (Ni/Co = 8/2) | Nitrogen | 450 | 1.03 | 5 | 2.2 | 700 | 8 | isopropyl triisostearoyl titanate | 2.5 | 0.12 | 165/164 |
| Example 13 | NiCo acetate (Ni/Co = 7/3) | Nitrogen | 450 | 1.03 | 5 | 2.2 | 800 | 7 | isopropyl triisostearoyl titanate | 1.0 | 0.12 | 159/158 |
| Example 14 | NiCo acetate (Ni/Co = 9/1) | Nitrogen | 450 | 1.03 | 5 | 2.2 | 650 | 9 | bis(dioctyl-pyrophosphate) ethylene titanate | 2.5 | 0.14 | 166/166 |
| Example 15 | Co acetate | Air | 450 | 1.03 | 5 | 2.2 | 850 | 9 | isopropyl triisostearoyl titanate | 1.2 | 0.10 | 135/134 |
| Comparative Example 5 | NiCo acetate (Ni/Co = 7/3) | Nitrogen | 450 | 1.03 | 5 | 2.2 | 750 | 5 | — | 0 | 0.63 | 157/143 |
| Comparative Example 6 | NiCo acetate (Ni/Co = 8/2) | Nitrogen | 450 | 1.03 | 5 | 2.2 | 650 | 6 | — | 0 | 0.70 | 164/153 |
| Comparative Example 7 | NiCo acetate | Air | 450 | 1.03 | 5 | 2.2 | 900 | 8 | — | 0 | 0.72 | 134/102 |

Electrochemical capacity (capacity of discharge in the first cycle)/(capacity of discharge in the tenth cycle)

As described above, the surface of the layered rock salt-type oxide particle powder of the present invention has been rendered hydrophobic, and therefore, the particle powder is characterized in that the amount of water adsorbed thereon is low, the adverse effect attributable to adsorbed water is prevented, the electrochemical charging and discharging capacities are high and its cycle deterioration is low, and in particular, the particle powder of the present invention acts as a positive electrode active material in a lithium battery and is thus useful as a material for a positive electrode active material in a lithium battery having high electromotive force and capable of high energy density change.

What is claimed is:

1. A lithium nickel-layered oxide particle powder having a rock salt structure, a lithium cobalt-layered oxide powder having a rock salt structure or a particle powder of a solid solution of these layered oxide powder having a rock salt structure, wherein the surface of the particle is rendered hydrophobic by coating it with a coupling agent having both a hydrophobic group and a hydrophilic group in an organic solvent.

2. A process for producing a lithium nickel-layered oxide particle powder having a rock salt structure, a lithium cobalt-layered oxide powder having a rock salt structure, or a particle powder of a solid solution of these layered oxide powder having a rock salt structure, which comprises the steps of:

(a) mixing each particle powder of nickel oxide, cobalt oxide, or a solid solution of these oxides with a lithium compound, (b) allowing the mixed powder to incorporate 1 to 10% by weight of water and compression-molding it to form a molded body having a molding density of not less than 2 g/cm$^3$, (c) calcining the molded body at 600 to 900° C. in an oxygen-containing gas to form a lithium nickel-layered oxide powder having a rock salt structure, a lithium cobalt-layered oxide powder having a rock salt structure or a solid solution of these layered oxide powder having a rock salt structure, (d) dispersing the layered oxide powder having a rock salt structure in an organic solvent, and (e) adding a coupling agent to this dispersion in order to coat the surface of the particle therewith.

3. The process according to claim 2, wherein each particle powder of nickel oxide or cobalt oxide is obtained by pyrolyzing at least one member selected from nickel- or cobalt-containing oxalate, acetate and carbonate at 350 to 500° C. in an oxygen-containing gas.

4. The process according to claim 2, wherein each particle powder of the solid solution of nickel oxide and cobalt oxide is obtained by pyrolyzing at least one member selected from nickel- and cobalt-containing oxalate, acetate and carbonate at 350 to 500° C. in nitrogen or an inert gas.

5. The process according to claim 2, wherein the particle powder of cobalt oxide is obtained by hydrothermal synthesis from a suspension containing cobalt hydroxide in the presence of an oxygen-containing gas.

6. The process according to any one of claims 2 to 5, wherein the mixing ratio of each particle powder of nickel oxide, cobalt oxide or a solid solution of these oxides and the lithium compound is, in terms of the molar ratio (Li/M) where L is mols of lithium and M is mols of nickel, cobalt or the total of nickel and cobalt, in the range of 1.00 to 1.20.

7. The process according to any one of claims 2 to 6, wherein the amount of the coupling agent for treatment is in the range of 0.1 to 5.0% by weight to the layered oxide particle having a rock salt structure.

8. The lithium nickel-layered oxide particle powder having a rock salt structure according to claim 1, wherein the coupling agent is at least one titanate coupling agent selected from the group consisting of isopropyltriisostearoyl titanate, isopropyltridecyl benzene sulfonyl titanate, isopropyl tris (dioctylpyrophosphate) titanate, tetra(2,2-diallyloxymethyl-1-butyl)bis(ditridecyl)phosphite titanate and bis (dioctylpyrophosphate)oxyacetate and bis (dioctylpyrophosphate) ethylene titanate.

* * * * *